United States Patent [19]

Wheeler et al.

[11] Patent Number: 4,587,021

[45] Date of Patent: May 6, 1986

[54] INHIBITION OF THE FORMATION OF INORGANIC OR BIOLOGICAL CACO₃-CONTAINING DEPOSITS BY A PROTEINACEOUS FRACTION OBTAINED FROM CACO₃-FORMING ORGANISMS

[75] Inventors: Alfred P. Wheeler, Clemson, S.C.; C. Steven Sikes, Mobile, Ala.

[73] Assignee: University of South Alabama, Mobile, Ala.

[21] Appl. No.: 563,280

[22] Filed: Dec. 19, 1983

[51] Int. Cl.⁴ .............................................. C02F 5/12
[52] U.S. Cl. ............................... 210/698; 106/14.05; 134/22.14; 252/180; 422/16
[58] Field of Search ............... 106/14.15, 15.05, 18.32, 106/18.33; 210/698; 252/180, 181; 422/16; 134/22.14

[56] References Cited

U.S. PATENT DOCUMENTS

| | | | |
|---|---|---|---|
| 117,462 | 7/1871 | Rickard | 252/180 |
| 2,264,654 | 12/1941 | Boyd | 252/181 |
| 3,533,940 | 10/1970 | Peniston et al. | 210/728 |
| 3,940,258 | 2/1976 | Copes | 106/14.15 |
| 4,534,881 | 8/1985 | Sikes et al. | 252/180 |

FOREIGN PATENT DOCUMENTS 12352 of 1887 United Kingdom ................ 252/181

OTHER PUBLICATIONS

Borman, et al, "The Role in CaCO₃ Crystallization . . . ", J. Biochem. 129 (1982) pp. 179-183.
Monsanto Technical Bulletin No. IC/SCS-3.
Biomineralization and Biological Metal Accumulation, pp. 205-247.
Science, vol. 19, Dec. 1975, "Soluble Protein of the Organic Matrix . . . ", pp. 987-989.
Comp. Biochem. Physiol., vol. 70A (1981) "Respiratory CO₂ and the Supply . . . ", pp. 285-291.
"Rates of Inorganic Calcium Carbonate Nucleation", Pytkowicz, pp. 196-199.
Calcif. Tiss. Res. 22 (1976), "Inhibition of Apatite Formation by Phosphorylated . . . ", Termine et al, pp. 149-157.
Calcif. Tiss. Int. 34 (1982), "Structural Factors Influencing . . . ", Williams et al, pp. 169-177.
Struc. Aspects of Recog. (1981), "Organic Matrix Mineral Relationships . . . " Weiner et al, pp. 467-482.
The Chem. and Biology (1981), "Repeating Amino Acid . . . ", Weiner, pp. 517-521.
Science, vol. 212, Jun. 1981, "Control of Calcium Carbonate . . . " (2 pages).

Primary Examiner—Richard V. Fisher
Assistant Examiner—W. Gary Jones
Attorney, Agent, or Firm—Oblon, Fisher, Spivak, McClelland & Maier

[57] ABSTRACT

The present invention relates to a method of inhibiting the formation of CaCO₃-containing deposits on a surface by applying a composition comprising an anti calcification-effective amount of the peptide-containing or the protein-containing fractions isolated from a CaCO₃-containing tissue obtained from a CaCO₃-forming organism. Said fractions can be isolated from many CaCO₃-containing tissues, including, but not limited to, molluscan shells, echinoderm skeletons, carbonate sands, crustacean exoskeletons, coral endoskeletons and the like. The present method is useful for the prevention and/or retardation of inorganic scaling, as well as, for the inhibition of fouling by plant or animal organisms.

21 Claims, 14 Drawing Figures

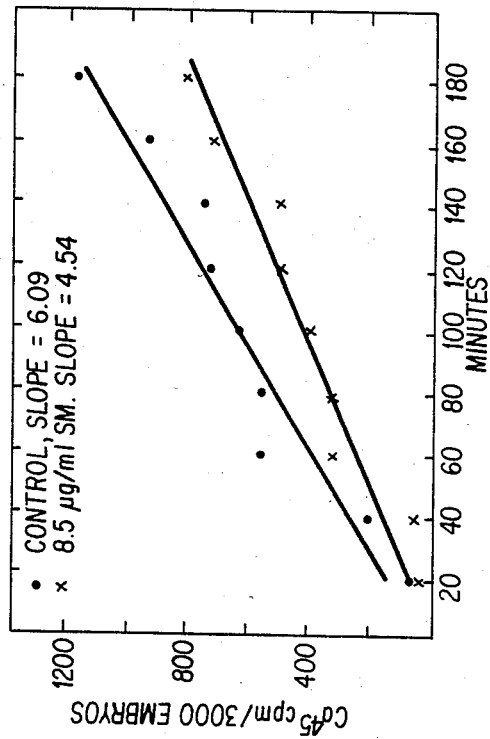
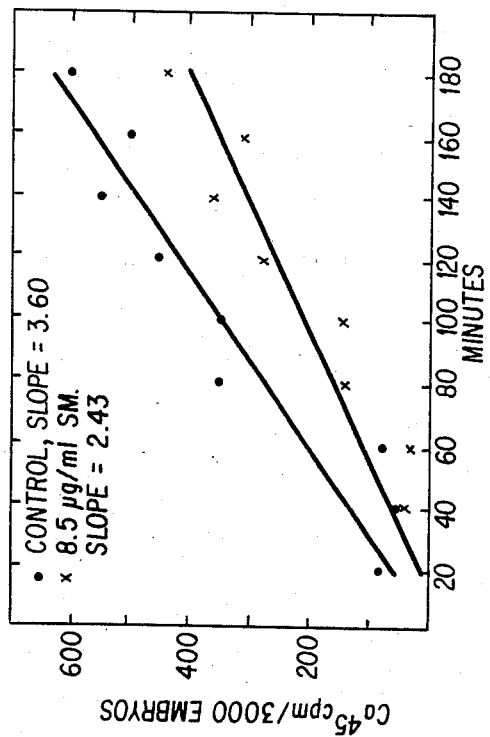
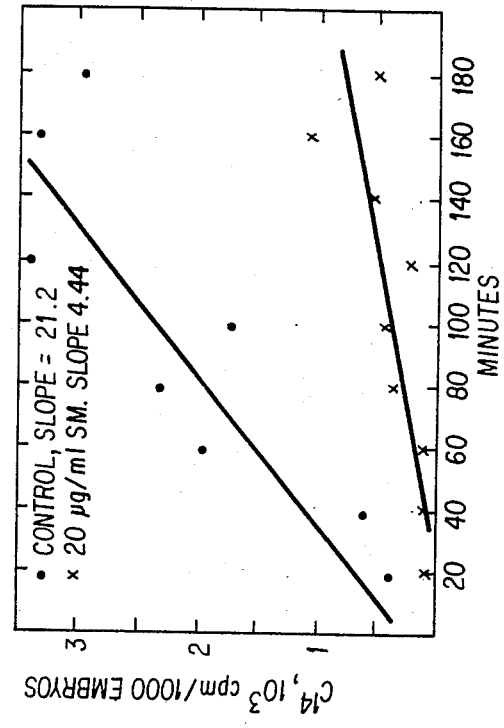
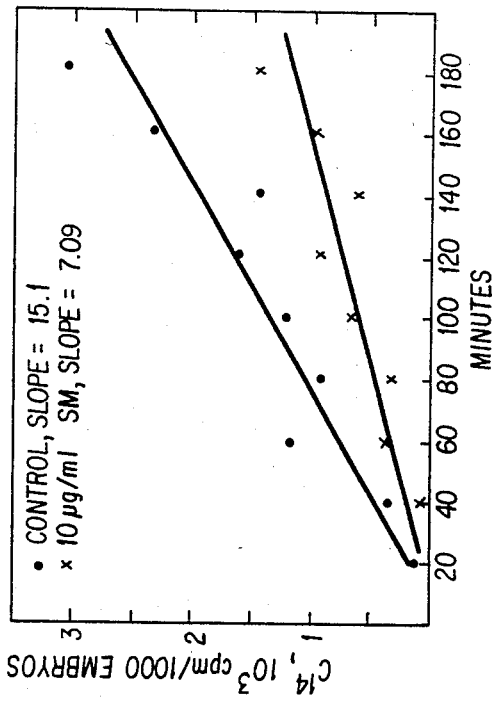
FIG. 7a
FIG. 7b
FIG. 7c
FIG. 7d

INHIBITION OF THE FORMATION OF INORGANIC OR BIOLOGICAL CACO₃-CONTAINING DEPOSITS BY A PROTEINACEOUS FRACTION OBTAINED FROM CACO₃-FORMING ORGANISMS

The work for the present invention was supported in part by grants from the National Science Foundation, and the U.S. Department of Commerce, National Oceanic and Atmospheric Administration.

BACKGROUND OF THE INVENTION

1. Field of the Invention

This invention relates generally to the subject matter of inorganic and biological $CaCO_3$ formation. More particularly, it relates to the inhibition of $CaCO_3$ deposition by a proteinaceous fraction obtained from $CaCO_3$-forming organisms. This proteinaceous fraction has been found effective for the inhibition of inorganic or biological $CaCO_3$-deposition on a surface with which it is contacted.

2. Description of the Prior Art

Control of $CaCO_3$-encrustation and growth of calcifying organisms on surfaces in marine environments has long been recognized as a potentially solvable problem. By preventing or slowing the occurrence of these "fouling" substances in organisms, the useful lifetime of surfaces such as hulls of ships and pilings of docks can be increased. In the case of hulls of ships, prevention of fouling also has the effect of allowing the ship to move more efficiently through the water.

Historically, the problem has been approached by impregnating or coating surfaces with compounds that interfere with the metabolism of fouling organisms. For example, the use of inhibitors of carbonic anhydrase, an enzyme often involved in calcification, has been suggested for such use (Costlow, J. D., Physiological Zoology, 32:177 (1959)). More recently, inhibitors of the enzyme polyphenol oxidase, also involved in the calcification process, have been shown as effective anti-fouling compounds (Turner, R. D., Symposium on Marine Biodeterioration, Naval Institute Press, Washington, D.C.). Less specific metabolic inhibitors, such as organotin compounds, are also being applied (Good, M. L., Symposium on Marine Biodeterioration, supra).

In addition, $CaCO_3$ crystal growth occurs abiotically in most natural solutions leading to unwanted calcified deposits. For example, scale builds up anywhere in the sea where nucleation occurs, because sea water is supersaturated with respect to $CaCO_3$ by a factor of 5 to 10-fold, allowing crystal growth to proceed spontaneously (Stumm, W. and Morgan, J. J., Aquatic Chemistry, John Wiley and Sons, Somerset, N.J. (1981)). Inorganic scales are also often encountered as unwanted deposits in pipes and boilers where supersaturation becomes a problem due to evaporative concentrations of ions. Carboxylates, such as NTA, ethylene diamine tetraacetate (EDTA) and gluconates have been used to retard or inhibit the precipitation of supersaturated solutions of calcium carbonate, although somewhat high concentrations are needed for these compounds to act as effective inhibitors. Hexametaphosphate, at 1-10 ppm concentration was found to retard scaling leading to the widespread use of polyphosphates as scale inhibitors in municipal and industrial water systems. (Monsanto's Technical Bulletin No. IC/SCS-323, Dequest 2010 Phosphonate).

In recirculating cooling water systems, calcium carbonate is generally the predominant scalant. Since cooling towers are efficient air scrubbers, this circulating water is saturated with $CO_2$, establishing an equilibrium between bicarbonate and carbonate in solution. As the pH of the water rises, this equilibrium shifts toward carbonate. Heating also forms a shift in the dissolved inorganic carbon equilibrium to the right, producing calcium carbonate:

$$Ca^{2+} + 2HCO_3^- \xrightarrow{\text{heat}} CaCO_3 + CO_2 + H_2O$$

Finally, calcium carbonate shows an inverse solubility trend, being less soluble at higher temperatures. All of these factors tend to produce scaling on critical heat-transfer surfaces which reduces the heat transfer efficiency, increases frequency of required cleaning and decreases the lift of the system. Several of the inhibitors of the precipitation of calcium carbonate show the phenomenon of a threshold effect, e.g., the prevention of precipitation from supersaturated solutions of scalants by substoichiometric levels of inhibitors. Present mechanistic theories postulate that the threshold agent is adsorbed on the growth sites of the scalant crystallite during the process of crystallization and alters the growth pattern so that the resultant scalant crystals are formed more slowly and are highly distorted. (Reddy M. M. and Nancollas, G. H., Desalination 12:61 (1973)).

A speculative model of organic matrix structure and function, based primarily on aspects of mollusk shell proteinaceous matrix biochemistry, as well as a brief review of the proteinaceous organic matrices from various other phyla was presented by Weiner, S., Traub, W. and Lowenstam, H. A., "Organic Matrix in Calcified Exoskeletons" in Biomineralization and Biological Metal Accum., pp. 205-224 (1983), Westbroek and De Jong, Eds., Reidel Publishing Co. Further characterization of the various matrical components, such as the soluble matrical fraction containing glycoprotein components can be found in Krampitz, G., Drolshagen, H., Hausle, J., and Hof-Irmscher, K, "Organic Matrices of Mollusk Shell", in Biomineral. and Biol. Metal Accum., supra, pp. 231-247 (1983), incorporated herein by reference. Calcium-binding, sulfated, high molecular weight glycoproteins have been identified in the soluble matrix of several species. In addition, this soluble fraction may also contain a number of smaller molecular weight components (Weiner, F. Lowenstam, H. A. and Hood, L. J., J. Exp. Mar. Biol. Ecol., 30:45-51 (1977), incorporated herein by reference). A further characterization of the amino acid sequence of soluble mollusk shell protein by peptide analysis after cleavage of the proteins on both sides of the Asp residues, showed a pattern of a repeating sequence of aspartic acids separated by either glycine or serine in an alternative manner with Asp. The repeating sequence observed is of the form $(Asp-Y)_n$-type, where Y is a single amino acid. The organic matrix of almost all mineralized tissues studied to date (both vertebrates and invertebrates) contain proteins which are enriched in aspartic acid (Asp) and/or glutamic acid (Glu) (Veis, A., and Perry A., Biochemistry 6:2049 (1967)); Shuttleworth, A. and Veis, A., Biochem. Biophys. Acta, 257:414 (1972), incorporated herein by reference).

The $(Asp-Y)_n$-type sequence was hypothesized to be present in the organic matrices from a variety of mollusks species, such as Crassostrea virginica, Mercenaria mercenaria, Crassostrea irredescens and Nautilus pompilius, and suggested that these sequences played a function as a template for mineralization, although X-ray diffraction studies showed that there was a poor match between the Ca to Ca distances in the crystal lattice and the potential calcium-binding sites along the polypeptide chain for this sequence (Weiner S. and Hood L., *Science* 19: 987 (1975); Weiner S., in *The Chem. and Biol. of Mineral. Connective Tissues*, Veis A., ed., pp., 517-521, Elsevier North Holland, Inc. (1981); and Weiner S. and Traub W., in *Struct. Asp. of Recog. And Assembly in Biol. Mascromolec.* Balaban, N., Sussman, J. L., Traub, W. and Yonath, A., Eds., pp. 467-482 (1981), incorporated herein by reference).

Acknowledging that the process of $CaCO_3$ nucleation and crystal growth itself is central to the process of encrustation by all calcifying organisms, whether they are barnacles, oysters, ship worms, algae and the like, Wheeler, A. P., George, J. W. and Evans, C. A., *Science* 212: 1397 (1981), incorporated herein by reference, made the discovery that a 170,000 MW glycoprotein obtained from the proteinaceous matrix that permeates the $CaCO_3$ of oyster shell is a very potent inhibitor, rather than an initiator of $CaCO_3$ nucleation and crystal growth as previously thought. The 170,000 glycoprotein was identified by staining for carbohydrates and it was shown to contain 10.2% carbohydrate by weight. The molecular weight and carbohydrate content reported for the glycoprotein from oyster shell are comparable to those observed for the protein obtained from clams by Crenshaw, M. A., *Biomineralization* 6: 6 (1972), incorporated herein by reference. Sikes, C. S. and Wheeler, A. P., in concurrently filed and co-pending U.S. application Ser. No. 563,252 entitled "Inhibition of Inorganic and Biological $CaCO_3$ Deposition by a Polysaccharide Fraction Obtained From $CaCO_3$-Forming Organisms", incorporated herein by reference, further disclose a method of inhibiting the formation of $CaCO_3$-containing deposits with a polysaccharide-containing fraction obtained from $CaCO_3$-forming organisms. The polysaccharide materials disclosed therein are substantially devoid of protein or polypeptide structures.

Sikes, C. S. and Wheeler, A. P., in concurrently filed and copending application Ser. No. 563,144, now U.S. Pat. No. 4,534,881, entitled "Inhibition of Inorganic or Biological $CaCO_3$ Deposition by Poly Amino Acid Derivatives", incorporated herein by reference, further disclose a method of inhibiting the formation of inorganic or biological $CaCO_3$ deposition by applying a synthetic amino acid polymer having a proteinaceous matrix-like structure.

Sikes, C. S. and Wheeler, A. P., in concurrently filed and copending application Ser. No. 563,145 entitled "Inhibition of Inorganic or Biological $CaCO_3$ Deposition by Synthetic Polysaccharide Derivatives", incorporated herein by reference, further disclose a method of inhibiting the formation of inorganic or biological deposition of $CaCO_3$ by applying to a surface in contact with $CaCO_3$ a synthetic saccharide polymer having a polysaccharide-matrix-like structure.

None of the cofiled, copending applications by the present inventors are considered prior art to the present invention.

An interest in further elucidating the role played by the soluble protein matrix from $CaCO_3$-forming animals in the inhibition of $CaCO_3$ encrustation and growth of calcifying organisms, prompted the present inventors to search for other potent and commercially useful inhibitors of said processes. This successful innovation and perfection, for the first time, of the process for the purification of new proteinaceous fractions (or peptide-containing fractions) from the soluble matrix of $CaCO_3$-forming animals, resulting in a significantly more potent calcium carbonate-deposition inhibitor, now opens the possibility of using the animal-derived protein fractions for the inhibition of calcium carbonate deposition in pipes, boilers, and the like, of widespread use in industrial environments, as well as for the prevention of fouling of surfaces in marine environments. The use of these highly potent protein-containing inhibitors for the inhibition or retardation of $CaCO_3$ deposition has heretofor been unknown in the art.

SUMMARY OF THE INVENTION

The present invention relates to a method of inhibiting the formation of $CaCO_3$-containing deposits on a surface by applying a composition comprising an anti calcification-effective amount of a peptide- or protein-containing fraction isolated from a $CaCO_3$-containing tissue obtained from a $CaCO_3$-forming organisms. Said fractions can be isolated from a variety of $CaCO_3$-containing tissues, including, but not limited to, molluscan shells, echinoderm skeletons, carbonate sands, crustacean exoskeletons, coral endoskeletons and the like. The present method is useful for the prevention and/or retardation of inorganic scaling, as well as, for the inhibition of fouling by plant or animal organisms.

A more complete appreciation of the invention and many of the attended advantages thereof will be readily perceived as the same becomes better understood by reference to the following detailed description when considered in connection with the accompanying figures.

BRIEF DESCRIPTION OF THE DRAWINGS

FIG. 2: This figure shows UV Absorption Spectra of whole soluble matrix and other protein- and peptide-containing fractions extracted with EDTA. The five lines shown correspond to:

(a) clam shell peak III, (675 µg/ml Lowry protein);
(b) whole soluble matrix from oyster shell, (490 µg/ml)
(c) oyster shell peak III, (460 µg/ml)
(d) oyster shell peak I, (376 µg/ml)
(e) oyster shell peak IV, (173 µg/ml)

All spectra were determined in distilled water at pH 6-7.

Figure 3A:
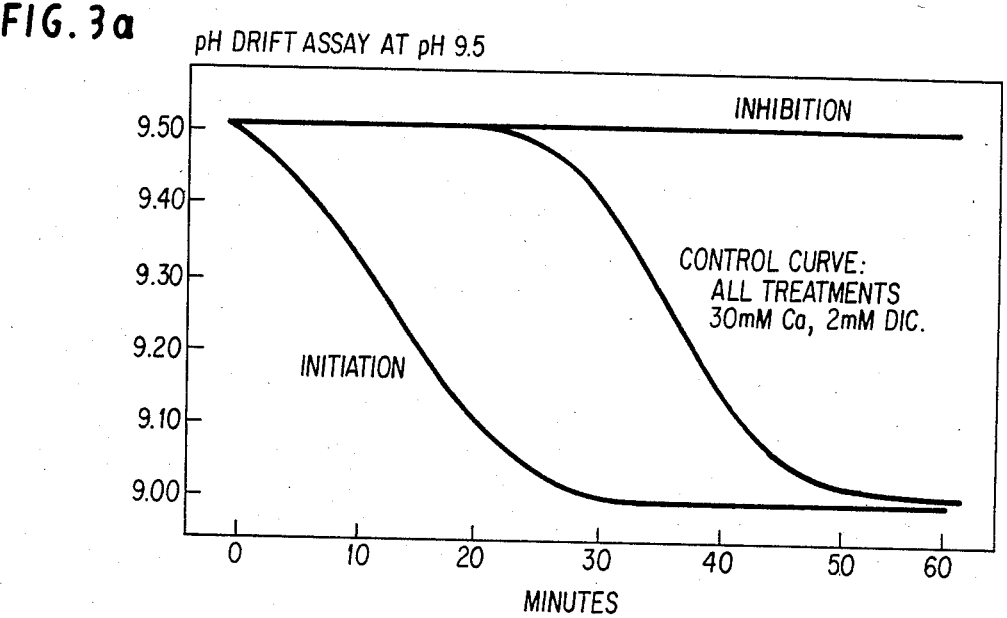
Figure 3B:
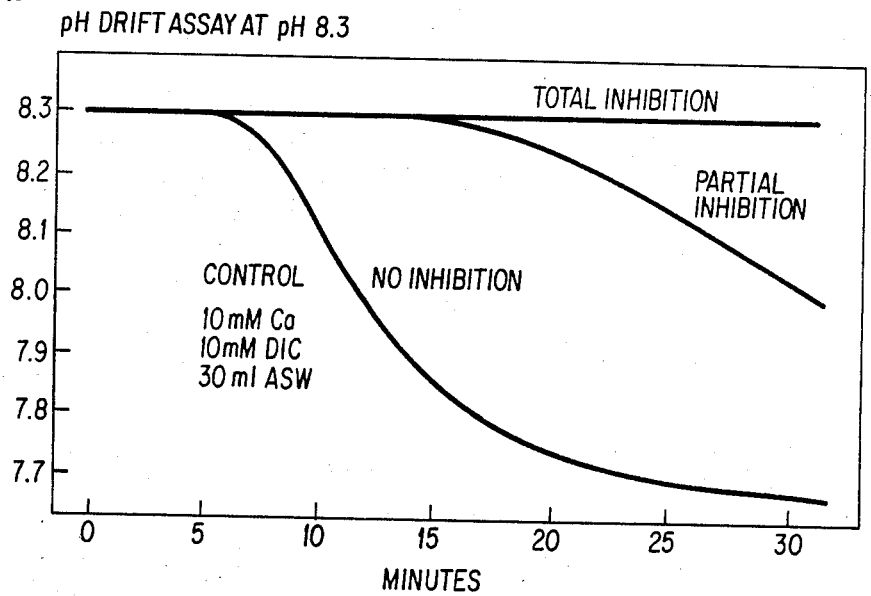

FIG. 3: pH-Drift Assays. Recorder tracings of $CaCO_3$ nucleation and crystal growth are shown in FIG. 3. Precipitation was measured as a function of the pH decrease in artificial seawater that accompanies removal of $CO_3^{2-}$ from supersaturated solutions. Either inhibition or initiation of crystal growth can be monitored by the effect of compounds on the duration of the lag phase prior to crystal growth. FIG. 3a shows data from assay carried out at pH 9.5 and FIG. 3b shows data from assay carried out at pH 8.3.

Figure 4:
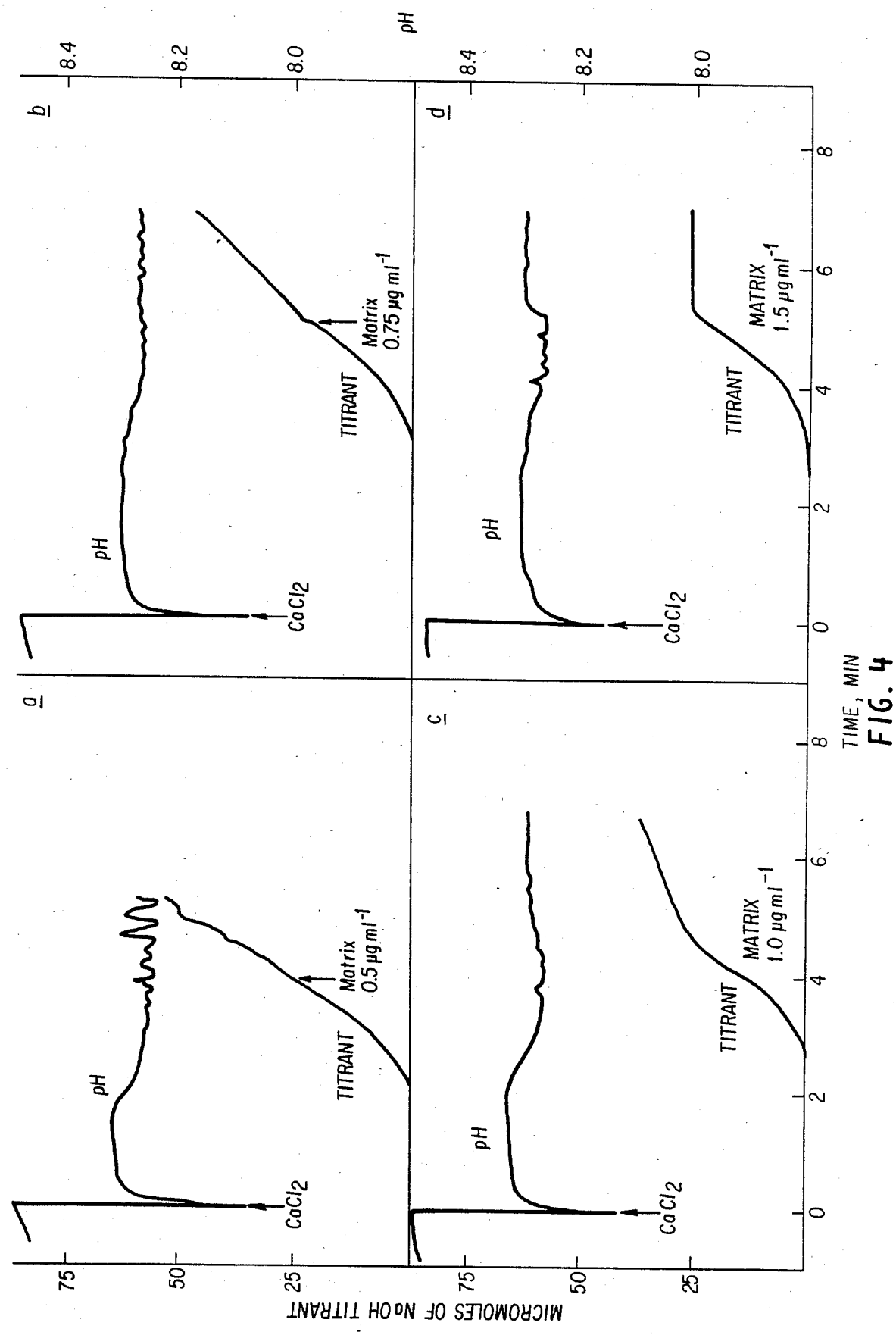

FIG. 4: pH Stat Assay. Experiments on the inhibition of $CaCO_3$ precipitation by whole soluble matrix of oyster shell are shown in FIG. 4. $CaCl_2$ was added at the first arrow and whole soluble matrix (final concentration indicated) was added at the second arrow.

FIGS. 4a, 4b, 4c and 4d correspond to separate experiments where the inhibitory effect of different concentrations of whole soluble matrix, MW $10^4$ to $10^7$ was tested. The concentrations were as follows:
(a) SM 0.5 μg/ml
(b) SM 0.75 μg/ml
(c) SM 1.0 μg/ml
(d) SM 1.5 μg/ml FIG. 5: This figure shows data for the inhibition of the rate of calcium carbonate precipitation as a function of the concentration of various oyster shell matrix fractions. Protein concentrations are given as Lowry protein in the medium. Inhibition is expressed as the ratio of the rate of precipitation after the addition of the inhibitor, divided by the rate of precipitation before addition of the inhibitor. The concentrations required for 50% inhibition as calculated from the curves are:
(a) whole proteinaceous matrix: 1.72 μg/ml;
(b) peak I: 3.88 μg/ml;
(c) peak III: 1.18 μg/ml;
(d) peak III filtrate: 1.05 μg/ml.
(pH-stat assay.)

Figure 6:
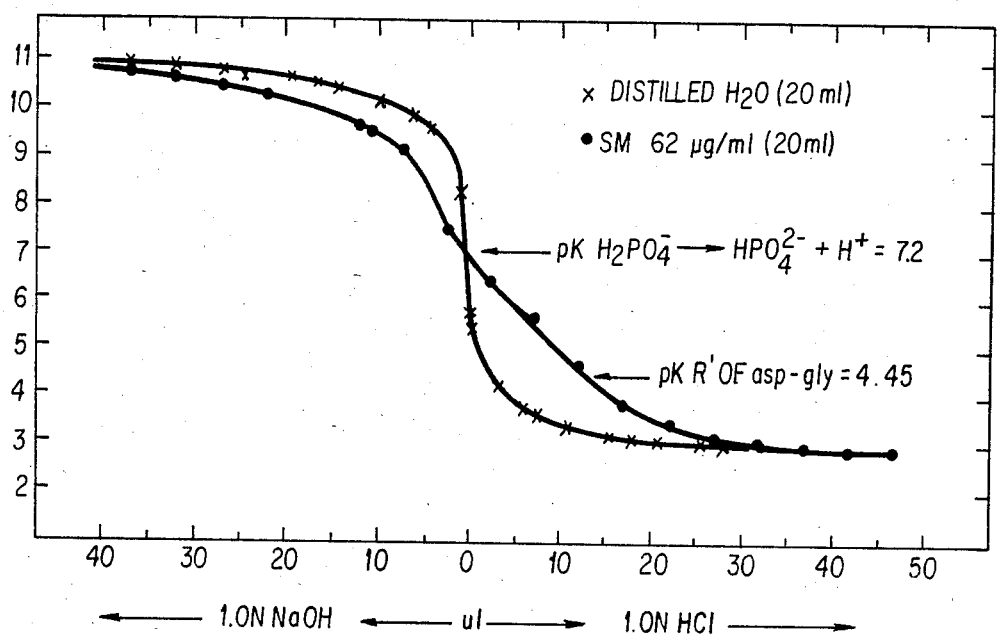

FIG. 6: This figure shows data for the pH titration of 62 μg/ml of oyster shell whole proteinaceous soluble fraction (SM) performed with 1.0 NaOH and 1.0N HCl at 20° C.

In the figure:
(x) titration of distilled water (control)
(o) titration of SM

FIG. 7: This figure contains representative results showing inhibitory effects of oyster shell whole soluble matrix (SM) on $CaCO_3$ spicule formation by sea urchin embryos. Plots shown in FIGS. 7a and 7b show results for experiments in which the urchin *Strongylocentrotus purpuratus* was used; plots shown in FIGS. 7c and 7d, are from experiments done using *Arbacia punctulata*. Lines were drawn by linear regression and correlation coefficients ranged from 0.794 to 0.979 (8.5 μg/ml SM protein).

In plot 7d, uptake of $^{14}C$ represents incorporation of the isotope into acid-stable compounds rather than into $CaCO_3$. Thus, calcification was inhibited completely at 20 μg SM/ml while other aspects of metabolism persisted. Radioisotopic measurements were made as reported elsewhere by Sikes, C. S. Okazaki, and Fink, R. D., Comp. Biochem. and Phys. 70A:285 (1981), and incorporated herein by reference.

Other objects, advantages and features of the present invention will become apparent to those skilled in the art from the following discussion.

DETAILED DESCRIPTION OF THE INVENTION

A 170,000 MW glycoprotein isolated from the soluble matrix of oyster shell has been shown to have an effect on the rate of precipitation of a $CaCO_3$, as measured by a change in the pH of $CaCO_3$-containing solution. The present invention relates to proteinaceous fractions obtained from $CaCO_3$-forming plants and animals which have a similar or unexpectedly higher $CaCO_3$-forming inhibitory activity. As such, the present invention relates to peptide-containing fractions having MW lower than 150,000, including peptide structures of as low as 400 MW. The present invention also relates to protein-containing fractions of higher than 200,000 MW, including MW up to $10^8$ and higher. Both the low and high MW fractions have substantial inhibitory activity of the formation of $CaCO_3$ and are thus useful as antiscaling, as well as antifouling agents.

The prevention of $CaCO_3$ formation by organisms (fouling) such as barnacles, molluscs, sea urchins and calcareous algae, among others is a very different problem than the prevention of inorganic $CaCO_3$ scaling. The biological formation of $CaCO_3$ is a complex process intimately associated with the metabolism of the organism. The forming crystals are normally insulated from the external environment by several membranous or cellular layers. These layers represent a potential barrier that could prevent an inhibitor of $CaCO_3$ crystal formation, particularly macromolecular ones, from reaching the site of crystal growth. Consequently, it was surprising when Applicants' studies showed that the peptide-containing soluble matrix of oyster shell could inhibit biological calcification as shown in FIG. 7. In the experiments shown in FIG. 7, sea urchins were used as an experimental animal. Experiments of the type shown in FIG. 7 were made using calcareous algae instead of sea urchins, also obtaining a high inhibitory effect. Thus, the results obtained with sea urchin and calcareous algae appear to be representative of a large variety of $CaCO_3$-forming organisms. The peptide-containing soluble matrix of oyster shell appears to be effective in controlling calcification by both plants and animals.

One possibility is that a small amount of the inhibitor in the solution where the plant or animal organism exists reaches the site of calcification, and once there, the mechanism of inhibition may be similar as that occurring during inorganic $CaCO_3$ crystal formation in vitro. However, it is also possible that the inhibitors may interfere with the metabolism of the organism, thereby inhibiting calcification indirectly. Accordingly, it is important to note that, e.g., oyster shell proteinaceous soluble matrix (20 μg/ml) does not inhibit the respiration of sea urchin embryos as measured by $O_2$ electrode by the method reported previously by Sikes, C. S., Okazaki, K., and Fink, R. D., *Comp. Biochem. and Phys.*, supra. However, the inhibitor was completely inhibitory of $CaCO_3$ spicule formation by the organism. Thus, it appears that the inhibitor acts specifically on crystal formation and not as a general metabolic depressant.

The peptide-like materials contained in the various soluble fractions are significantly stable polyamidic structures as shown in the examples. Since the soluble matrix has a proteinaceous nature, it would appear that it may be biodegraded, and thus susceptible to deactivation through catabolism. However, the evidence suggests that the inhibitory potency of the different preparations of the peptide-containing soluble matrices are preserved for up to several hours, without being metabolically degraded. Further, the smaller MW peptide-containing fractions appear to behave similarly. All MW fractions are stable and maintain their $CaCO_3$-forming inhibitory activity at room temperature for over 1,000 hours, and even longer periods of time. The lower MW peptide-containing fractions are also stable at room temperature for prolonged period of time. In addition, all fractions have been shown to resist a treatment with moderate amounts of pressure while preserving their characteristics and activities. Further, all the fractions of this invention possess high stability and maintain their inhibitory activity of $CaCO_3$ formation when kept under refrigeration for periods of up to a year and longer.

The preparation of the soluble proteinaceous matrix fractions of this invention can be accomplished by a variety of known methods. One of the preferred methods of preparing the various peptide-containing soluble matrices from $CaCO_3$-forming organisms will be described herein. The animals may be obtained fresh, shucked, the $CaCO_3$-containing tissues cleaned overnight with, e.g., a 5% NaOH solution, and the external and internal surfaces scrubbed clean and rinsed with, e.g., distilled water. The $CaCO_3$-containing tissues may be ground with, e.g., a mortar and pestle or with a hammer mill to pass through a mesh screen, e.g., a 1 mm mesh screen. Ground $CaCO_3$-containing tissues may be dialyzed against, e.g., 10% (w/v) EDTA, pH 8.0, using a dialysis membrane having a 10,000–15,000 cut-off MW to define separate compartments. Other concentrations of EDTA, pH's or cut-off MW dialysis membranes, can also be used according to the needs. Some of the different conditions which may be used are dissolution with organic, as well as inorganic acids, such as acetic, hydrochloric or sulfuric acid or other acids, or dissolution with chelating agents, such as $Ca^{++}$-chelating agents, or by directly stirring shell material in any dissolution media. This step can also be practiced with agitation, either manual or mechanical to ensure the stirring of the solution. Preferred concentrations for $Ca^{++}$-chelating agents are 0.001–20%, and for weak organic acids, 0.001–20%, although lower or higher concentrations can also be used if the pH of the solution is maintained at about 1–5. Inorganic acids are preferably used in concentrations which preserve the pH of the solution at about 1–5, as well. The dialysis membrane can also be in the form of a bag surrounded by the dialysis solution for small scale preparations.

The thus dialyzed preparation can be centrifuged to separate the soluble components from insoluble materials. However, any method to separate the supernate from insoluble debris can be utilized. If the preparation is centrifuged, this is preferably carried out in various stages. Large size debris can be removed by filtration or centrifugation at low accelerations. Preferred accelerations for this centrifugation are 100–1000 xg. Further centrifugation steps may be added using ever increasing centrifugal accelerations, up to about 30,000 xg for an appropriate length of time to remove the insoluble matrix (I.M.). In general, approximately 20 minutes of centrifugation appear to be sufficient to remove the insoluble matrix from this preparation, although longer centrifugation times can be used.

The IM itself, can be treated with any base, e.g., NaOH, in order to liberate soluble proteinaceous or peptidic materials, which are highly active in the inhibition of $CaCO_3$ crystal growth in concentrations equivalent to those of the SM itself.

The supernatant may be further dialyzed exhaustively for an appropriate length of time, preferably with a number of changes of the external solution. Preferred conditions are those where the preparation is dialyzed against deionized and distilled water for several days. If EDTA was included in the dissolution media, at least one dialysis step against a neutral buffer of at least 10 mM ionic strength may aid in the thorough removal of the chelating agent. Any method of dialysis may be used herein. Preferred are conventional or continuous flow ultrafiltration. The dialysate can be concentrated by, e.g., ultrafiltration, although other methods can also be used e.g., lyophilization, flash evaporation, or osmosis. Any size MW filter can be used for the ultrafiltration step. However, some of the filters preferred are 10K–100K MW filters (Amicon, Spectrapor). The dialysate is preferably concentrated using a 10,000 MW filter. The retentate from the ultrafiltration step, may be further fractionated by any known method which permits the isolation of different MW fractions. One method of fractionation can be implemented by using Sephacryl S-300 (Pharmacia, Upsala)-type substrates and the different fractions may be collected separately. Separate fractions can be further pooled in order to obtain separate preparations having specific MW protein or peptide-containing materials. Thus, all fractions containing protein or peptide-like components having up to 100 million MW can be pooled and utilized as such.

Fractions containing $1K-1.5\times10^5$ MW are preferred for inhibiting the deposition of $CaCO_3$. Further preferred fractions are those having $2\times10^5$ to $10^8$ MW proteinaceous materials. Further yet, peptide-containing fractions having narrower MW ranges, are also preferred. Some examples of these are: 2,000–120,000, 60,000–120,000 MW, 25,000–60,000 MW, 20,000–40,000 MW, 40,000–60,000 MW, and smaller MW, e.g., 1K–20K, 10K–20K, or 2K–10K, are particularly preferred. Also preferred are fractions containing $2\times10^5-10^7$ MW, $2\times10^5-10^6$ MW and $10^6-10^7$ MW, among others.

The smaller molecular weight fractions (400–20K) can be prepared by further hydrolysis of the protein or peptide-containing fractions, with 0.001 to 10N base, such as NaOH, KOH, or $NH_4OH$, or 0.01–6N acids, such as HCl, $H_2SO_4$, formic, acetic or other organic acids, although any base or acid within the cited concentrations can also be used. Other types of hydrolyses are also useful for the preparation of the smaller MW peptide-like preparation, e.g., enzymatic hydrolysis, may also be used. These hydrolyses are preferably performed at temperatures ranging from 5° to 110° C. from 5 minutes to 120 hours, although they can be carried out at other temperatures and for different times.

The peptide and the protein-containing fractions can be further purified by, e.g., ion exchange chromatography on diethylaminoethyl (DEAE) cellulose-type substrate (Pharmacia, Upsala) pH 8.0, although the unpurified fractions may also be used without further purification. Ion exchange may be carried out by elution of material by step-increasing the ionic strength of the eluent to 2M, or by eluting with a continuous ionic strength gradient. When the purification is carried out by this method with NaCl, the highest activity from the $1K-10^5K$ materials elutes at about 0.3M NaCl. Other methods of fractionation may be useful in obtaining higher activity fractions, e.g., high performance liquid chromatography, electrophoresis, and centrifugation, among others.

The filtrate from the ultrafiltration step may be further concentrated on, e.g., QAE-cellulose-type substrates, and eluted with various salts, e.g., 2M NaCl. The thus eluted fraction may be further dialyzed and further purified on, e.g., DEAE cellulose, as previously done.

The $2\times10^5$ and higher MW fractions can be isolated from the solubilized proteinaceous materials (including the materials obtained from the IM) by art-known methods of gel filtration, among others. As such, the high MW proteinaceous fractions can be separated from the remaining materials, including lower MW proteinaceous fractions, if so desired. Upon hydrolysis by known methods, such as acidic, basic or enzymatic hydrolyses peptide-containing fractions of lower MW can be obtained.

All fractions tested were found to be active as inhibitors of the formation of $CaCO_3$. The relative activities shown by the various fractions are exemplified, infra. Tables 3 to 6 in the examples include data related to this activity. Some of the most active fractions are those obtained by further fractionation of peak III (lower portion of the intermediate MW peptidic fractions) and further hydrolysis and/or fractionation of peak I (high MW proteinaceous fractions).

The peptide and protein-containing fractions obtained at different stages of the above-described preparation method, may be utilized directly without additives or carriers for inhibiting the deposition of $CaCO_3$, whether of inorganic or biological origin. Alternatively, the various prepared peptide-containing soluble fractions obtained from $CaCO_3$-forming organisms may be utilized by adding an effective amount of the inhibitor fraction to a liquid in contact with a surface on which the deposits may form. Such is the case of industrially useful and commercially important containers, e.g., boilers, piping, desalinators, cooling towers, and the like. The various peptide-containing and protein soluble fractions of this invention can be added to water, water-containing, or other liquids in an amount as small as 0.1 ng/ml. The upper limit for the amount of the peptide fractions is only given by their solubility in the liquid to which they are added. However, if the presence of insoluble peptide or protein-containing residues of these fractions does not interfere with industrial operations, it may be desirable to add these inhibitors in an amount greater than that given by their solubility limit. A preferred range of the various peptide-containing or protein-containing fractions for controlling inorganic $CaCO_3$ scaling is $10^{-14}$–$10^2$ μg/ml. Other preferred ranges are $10^{-4}$–$0.1$ and $0.1$–$10^2$ μg/ml of the various peptide or protein-containing fractions.

When the present inhibitors are utilized for their antifouling characteristics in order to prevent the encrustation of plant or animal organisms, they can be added to a liquid, such as water, water-containing or other non-aqueous liquids, preferably in an amount about 0.001–1,000 μg/ml although larger amounts can also be used. Used within this range of concentrations, the present inhibitors find an application in the prevention of encrustation of organisms in, e.g., running water piping or sewage piping, among others. The present inhibitors can also be applied directly to a surface before it becomes in contact with $CaCO_3$-containing liquids, e.g., industrial containers, marine surfaces, such as those in piers, ships, and the like. The present inhibitors may be applied by themselves or in combination with other salt deposition inhibitors, anti rust agents, or the like and/or with a carrier directly to the exposed surface, or they may be mixed with polymers used for the protection of said surfaces. A variety of carriers are contemplated for the application of the present inhibitors. Some of the most common carriers include aqueous and non-aqueous liquids, gels, oils, organic and inorganic solvents, compressed gases, and the like. However, any carrier may be used according to the needs. When used in high concentrations by themselves, the peptide and protein-containing inhibitors of this invention may be highly viscous and can be easily applied to a surface. After the application of the inhibitor, an appropriate length of time may be allowed for the penetration of the inhibitor into the surface, as is the case with porous surface materials such as wood, ceramics, and the like. Thus, a large storage of the present inhibitors is created within the material, and the surface may then be sealed with a polymer. Alternatively, fractions obtained from either SM or IM may be mixed with a carrier to form a suspension which can be applied to a surface. The present inhibitors may be applied to any type of surface which may be exposed to the formation of inorganic or biological $CaCO_3$ deposits. Some of the most common materials to which the present inhibitors may be applied are metals, woods, synthetic polymers and copolymers, glass, ceramics, painted and otherwise coated surfaces, although other materials are also contemplated. When in contacct with the $CaCO_3$-containing liquid, the inhibitors will slowly leak out from underneath the polymer layer. The present inhibitors may further be applied in admixture with the polymer, e.g., paints or any synthetic polymer used for the protection of surfaces. When the present inhibitors are used in admixture with a polymer, they can be used in a concentration of between 0.001–90% by weight, although higher and lower concentrations are also contemplated in this invention. Some of the preferred concentrations are 1–75% by weight. Other preferred concentrations are 5–25%, 25–50% and 10–40% by weight.

When applied to a surface, the present inhibitors may be formulated as a powder, solution, suspension, gel, oil aerosol, paste or viscous colloid.

Having generally described the invention, a more complete understanding can be obtained by reference to the Examples which are provided herein for purposes of illustration only, and are not intended to be limiting unless otherwise specified.

EXAMPLES

Preparation of Soluble Matrix and Matrix Fractions

Molluscan Shells

The shells of freshly shucked oysters and clams were washed in 5% NaOH and scrubbed free of dirt and algae. After drying, the shell was ground in a mortar and pestle or with a hammer mill and passed through a 1 mm mesh screen. The ground shell was placed in 12-14000 MW cutoff dialysis tubing and the dialysis medium was agitated at 20-25 C. using a motor driven cam so that the solution inside the bag is stirred. For EDTA preparations, the dialysis medium was 10% w/v EDTA, pH 8.0 and for acetic acid extracts the medium was 1.25% v/v glacial acetic acid, ~pH 3. For the acetic acid preparations a vent tube is inserted in the dialysis tubing to release $CO_2$ during dissolution.

Following shell dissolution, the contents of the dialysis bag are centrifuged in two stages to remove the insoluble matrix (IM): the first utilizing a low acceleration and the second at 30,000 xg for 20 min. For the acetic acid preparations, the extract was dialyzed briefly against 0.5% acetic acid and then against water. Following this, the extract was neutralized by addition of NaOH. These steps are only necessary to optimize the recovery of soluble matrix (SM) since the SM becomes relatively insoluble at low pH.

Exhaustive dialysis of the supernatant containing the SM fraction at 4° C., follows the centrifugation step. For the EDTA preparations, one dialysis step against 1 mM EDTA is usually included.

Figure 1:
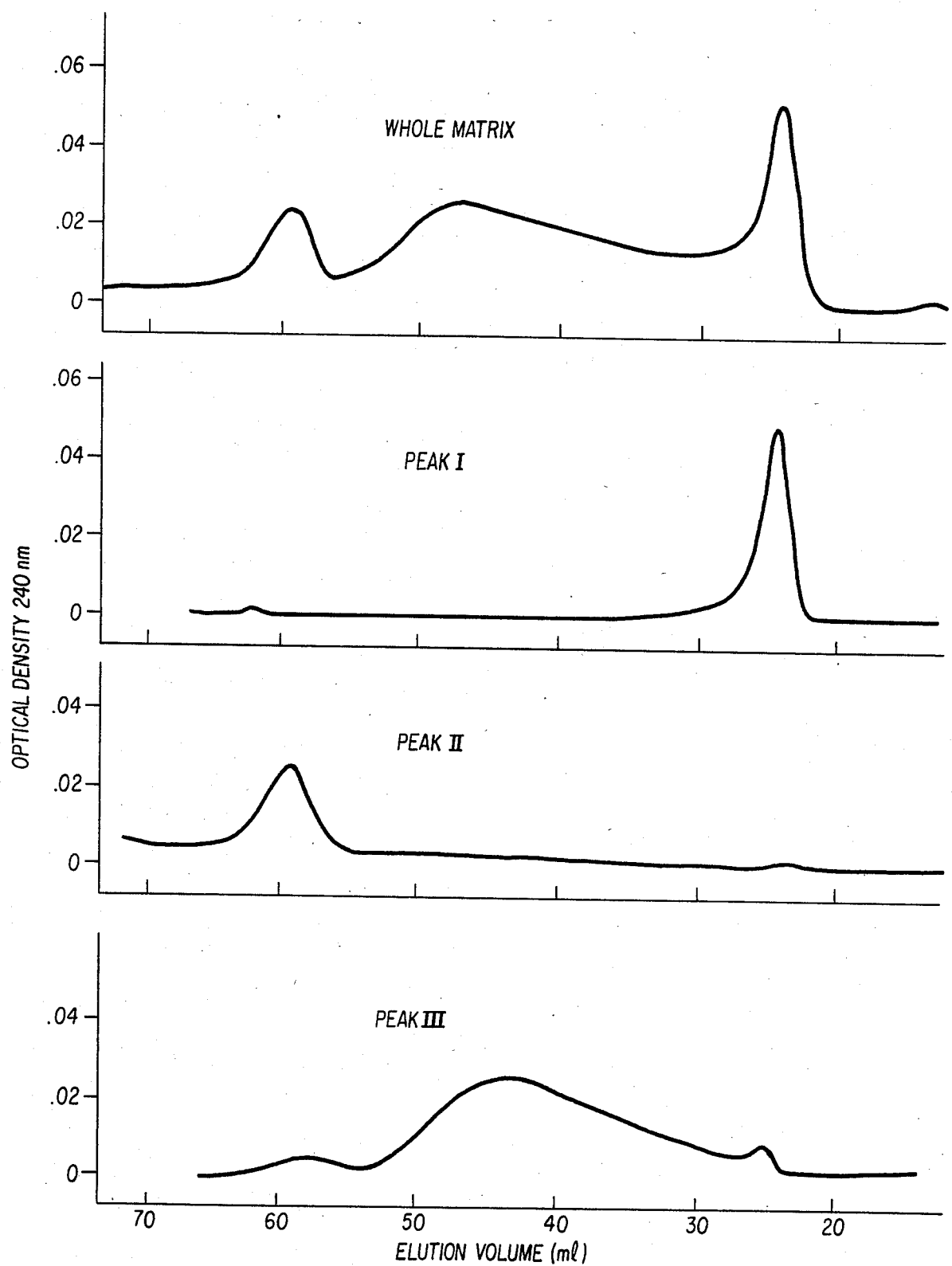
FIG. 1: This figure shows tracings of the different fractions obtained by gel filtration of whole oyster soluble matrix (SM) and various DEAE ion-exchange peaks on Sephacryl S-300. Bed diameter, 1.5 cm; bed volume, approximately 70 ml; flow rate, 1 ml/min; elluent, 50 mM Tris, pH 8.0.

The dialysate was concentrated under N₂ by ultrafiltration using a 50,000 MW filter (Spectrapor). The retentate was fractionated on Sephacryl S-300, and eluted with 50 mM Tris, pH 7.4. For EDTA extracts, three major molecular weight classes appear (see FIG. 1): One at the void volume representing proteins of MW >500,000 (Peak I); a broad peak which represents 20 to 60,000 MW proteins (Peak III); and a peak which represents material of 12,000 MW or less (Peak II).

These classes can also be obtained with ion exchange chromatography using DEAE-cellulose buffered with 10 mM Tris, pH 8.0 and eluted with a step gradient of 0.1-2.0N of NaCl. The correlation between ion exchange fractions and molecular weight fractions is apparent from FIG. 1. That material which elutes with the buffer only (peak I) contains nearly exclusively high molecular weight material mostly MW higher than 500,000. When peak I was further fractionated on Sephacryl S-500, it was determined that this peak contains materials including molecular weights greater than 5 million daltons. Material that elutes second with 0.1M NaCl contains nearly exclusively the low molecular weight material (peak II), and material that elutes third, with 0.3 NaCl (peak III) contains mostly the intermediate molecular weight material. A variable amount of material elutes with 0.4M NaCl (peak IV) and usually contains a molecular weight class between peak I and peak III. Little, if any, material elutes if steps between 0.1 and 0.3M NaCl are included, nor at the end of a series when a 2M NaCl step is included.

The various peaks may be further purified by selecting fractions from a preparative S-300 column which are then concentrated and further selected on the basis of ion exchange chromatography. For example, material designated as peak III which eluted as primarily intermediate molecular weight material on S-300 was subsequently eluted with 0.3M NaCl on DEAE. If this material is rechromatographed on S-300, it contains only intermediate molecular weight material.

It has been determined that peak II may contain a significant quantity of EDTA. Infrared analysis of this peak nearly match those for EDTA. Further, the fraction is virtually unreactive in the Lowry protein assay and shows no reaction with ninhydrin following treatment under hydrolytic conditions. Much of peak II can be eliminated by dialyzing the extract against, e.g., 0.05M tris(trishydroxymethylaminomethane)-HCl, pH 7.4.

The filtrate from the ultrafiltration step contains significant quantities of peak III and peak II. It was concentrated on QAE-cellulose from which it was eluted with 2M NaCl. The thus obtained eluent was dialyzed against water and purified in the same way as for the retentate of whole matrix preparations.

When acetic acid extracts are fractionated in the same manner as the EDTA extracts, peaks I, III and IV proteins can be identified. However, no peak II or low molecular weight components are usually evident (data not shown). Again, this is not surprising considering peak II appears to be largely EDTA.

Soluble matrix isolated from the clam *Mercenaria mercenaria*, has nearly the same chromatographic behavior when fractionated on S-300 and DEAE (data not shown).

ECHINODERMS

Sea urchins make CaCO₃ skeletons. An EDTA extract was prepared according to the method described for shells, supra. Sea urchins are completely unrelated to molluscs in an evolutionary sense and hence were chosen as source material to demonstrate the generality of this discovery. The soluble matrix from sea urchin skeletons is proteinaceous and was measured as described above for molluscan SM, yielding about 4 mg urchin SM per 10 g of skeleton.

CHEMICAL ANALYSIS OF SM FROM MOLLUSCAN SHELL

Protein concentration was determined by the method of Lowry, D. H., Rosebrough, N. J. Farr, A. L., and Randall, R. S. J. Biol. Chem. 193:265 (1951), with bovine serum albumin (Sigma) as a standard. Poor color development occurred when the technique of Bradford N. M., Anal. Biochem. 72:248 (1976) was used. This interference was thought to result from the presence of carbohydrate associated with the proteins.

Carbohydrate analysis was carried out using the phenol-sulfuric acid method of Dubois, M. K., Guilles, A., Hamilton, P. A. and Smith, F., Anal. Chem. 28:350 (1956) with glucose as a standard. For the phosphate and the sulfate analyses, the SM was first refluxed in 25% formic acid. Phosphate analysis was accomplished by a modification of the method of Marsh, B. B.. Biochem. Biophys. Aceta 32: 351 (1959). Sulfate analysis was carried out using the method of Antonopoulos (Acta Chem. Scand. 16:1521 (1962).

The results of some of the analyses are presented in Table 1. It is clear that peak I contains significantly more carbohydrate than peak III or the whole matrix. It is not surprising that peak II has little carbohydrate, in that this peak is primarily EDTA. The presence of significant phosphate in matrix and peak I and III is interesting in light of the fact that many carbonate inhibitors are phosphonates (Reddy and Nancollas, supra). In fact, there is a possibility that phosphate is associated with matrix other than entirely through an oxygen ester linkage because base hydrolysis and treatment with alkaline phosphatase hydrolyze only approximately 25% of the total bound phosphate.

Sulfate was also detected in oyster matrix. The analysis resulted in variable estimates which ranged from 2 to 10% by weight. This can be compared with the study of Crenshaw, M. A., Biomineralization 6:6 (1972) for Mercenaria in which a sulfate content of about 10% was reported. The presence of sulfate may be significant in that $SO_4^{2-}$ is thought to be an active component of the soluble matrix of calcareous deposits (coccoliths) of some marine algae coccolith polysaccharide (DeJong, E. W., van der Waal, P. Borman, A. H., deVrind, J. P. M., vanEmburg, P., Westbroek, P., and Bosch, L., in Biomineralization and Biol. Metal Accumul., pp. 291–301, Westbroek, P., and deJong, E. W., eds. Reidel Publ. Co., 1983).

TABLE 1

CARBOHYDRATE AND PHOSPHATE CONTENT OF OYSTER SHELL SOLUBLE MATRIX AND FRACTIONS:

| Fraction | Carbohydrate μg/mg | N | Phosphate μg/mg | N |
|---|---|---|---|---|
| Whole Matrix | 88.1 ± 12.1 | 9 | 56.8 ± 0.6 | 5 |
| Peak I | 233.7 ± 41.4 | 8 | 57.9 ± 0.7 | 4 |
| Peak II | Trace | 4 | Trace | 4 |
| Peak III | 71.1 ± 10.2 | 9 | 44.0 ± 0.5 | 4 |

μg/mg Lowry Protein, mean values ± SEM.

CALCIUM BINDING PROPERTIES OF OYSTER SHELL SM

The oyster shell soluble matrix was examined for calcium binding by dynamic equilibrium dialysis and by use of a calcium electrode.

High affinity calcium binding analysis was carried out using a modification of the equilibrium dialysis method of Colowick, S. P. and Womack F. C., Biol. Chem. 224:774 (1969). Briefly, two lucite chambers were separated by a 12-14K dalton nominal pore size dialysis membrane (Spectrapor). The volumes in the top and bottom chambers were 1.7 ml and 0.5 ml respectively. The dialysis buffer (500 mM NaCl, 10 mM KCl, 5 mM HEPES, pH 8.0) was pumped through the bottom chamber at a constant flow rate of 2 ml min$^{-1}$ using a peristaltic pump. The top chamber contained buffer and 350-650 μg of SM, or SM fractions. Initially, 20 μCi of $^{45}$CaCl$_2$ (ICN) was added to the top chamber containing a final concentration of $1.2 \times 10^{-5}$M Ca$^{2+}$. Calcium chloride was added in increments, to a final Ca$^{2+}$ concentration of 0.90 mM. A final addition of Ca$^2$ to 25 mM displaced the remaining $^{45}$Ca$^{2+}$ from the SM. Following each addition of Ca$^{2+}$, a steady state between the two chambers was reached when 2 ml of buffer had passed through the bottom chamber. The eluant from the lower chamber was collected in 2 ml aliquots and counted on a Beckman LS 7000 scintillation counter. For the competitive studies, Mg$^{2+}$ was added, at the appropriate concentrations. All experiments were executed at room temperature (22°-25° C.).

Low affinity Ca$^{2+}$ binding studies were carried out using a Ca$^{2+}$ specific electrode (Orion Model 93-20). For the controls, increasing increments of a CaCl$_2$ solution were added to 2 ml of buffer (500 mM NaCl, 10 mM KCl, 5 mM HEPES, pH 8.0), in appropriate volumes, to generate a standard curve that ranged in free [Ca]$^{2+}$ from $10^{-5}$M to $10^{-3}$M. For the samples, the SM was added to the buffer solution prior to the addition of the CaCl$_2$. The Ca$^{2+}$ bound by the SM was determined from the difference in free [Ca]$^{2+}$ of the controls and samples. In the competitive studies, both the samples and standards contained 50 mM Mg$^{2+}$. The results of the equilibrium dialysis experiments for the whole matrix demonstrate a high dissociation constant of $0.90 \pm 0.24 \times 10^{-4}$M ($\overline{X} \pm$SEM; N=5 preparations, 2 assays per preparation) and a capacity of $622 \pm 68$ nmol mg$^{-1}$ ($\overline{X} \pm$SEM; N=5 preparations, 2 assays per preparation). These studies also demonstrate a significant positive cooperativity in the binding process (George, M. S. thesis, Clemson University, Clemson, SC, (1983). The calcium electrode studies resulted in a second constant of $0.48 \pm 0.067$ L nM with a capacity of $5.80 \pm 0.53$ μmol mg$^{-1}$ ($\overline{X} \pm$SEM, N=5). These values are similar to those reported for shell soluble matrix from *Mercenaria mercenaria* (Crenshaw, M. A., Biomineralization, 1972, supra) and from the coccolith soluble matrix of the algae *Coccolithus huxleyi* (DeJong, E. W., Bosch, L., and Westbroek, P., *Eur. J. Bioch*, 70:611 (1976)).

The only fraction that displayed any appreciable high affinity binding was peak II. This is not surprising, as peak II is constituted largely by EDTA. Further, no high affinity binding could be detected for the acetic acid extracts. The positive cooperativity seen for whole matrix may result from an association of EDTA with protein, the same association which may cause some EDTA to be relatively non-dialyzable. In support of this idea, peak II alone demonstrates no cooperativity in binding studies. In summary, these findings call into question the role of high affinity binding in the regulation of calcium carbonate crystallization, since materials highly active in the inhibition of CaCO$_3$ formation do not appear to show high affinity binding.

In preliminary studies both acetic acid extracts and peak I and III fractions from EDTA extracts demonstrate low affinity binding of the same order as whole EDTA matrix extracts. The sites responsible for the low affinity binding observed may have some significance in calcium carbonate mineralization, and therefore an anti-scaling or anti-fouling.

ULTRAVIOLET ABSORPTION SPECTRUM OF SM FROM MOLLUSCAN SHELL

Figure 2:
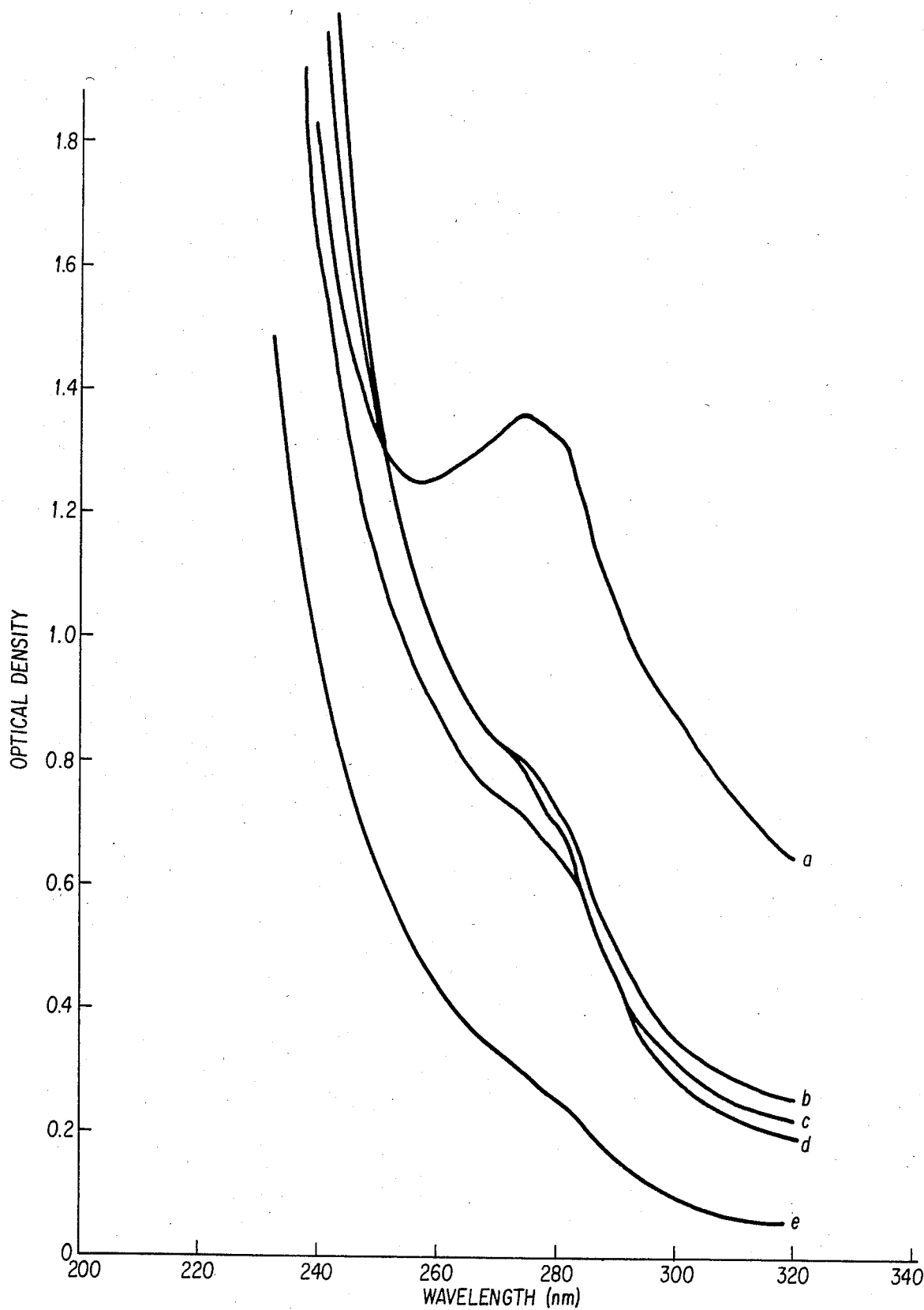

The U.V. spectrum of oyster shell soluble matrix and the protein fractions extracted therefrom have two distinguishing characteristics (FIG. 2). The first is that the absorbance at 280 nm divided by the absorbance at 260 (280/260 ratio) is less than one. For most proteins, this ratio is greater than one. The deviation in this case may be due in part to the presence of phosphate covalently linked to the protein. This suggestion is supported by the fact that phosphodentin, a calcium phosphate regulatory protein extracted from teeth, has a ratio less than one (Veis A., Spector, A. R., and Zamosciamyk, H., *Biochim. Biophys. Acta* 257:40-4 (1972)). Further, matrix and fractions of matrix extracted from the clam, *Mercenaria mercenaria* contain little or no phosphate and have 280/260 ratios greater than one (FIG. 1a).

The second characterization of the U.V. spectrum of oyster matrix and the fractions thereof is the presence of dual shoulders in the 280 nm region, one at approximately 276 nm and another at about 282 nm. This is often diagnostic for the presence of tyrosine, which may be the main aromatic amino acid in the preparations. Further, under basic conditions, these shoulders disappear and the spectrum undergoes a red shift. This may represent the ionization of the hydroxyl group of tyrosine.

STABILITY OF COMPOUNDS THAT INHIBIT CaCO$_3$ FORMATION VERSUS TEMPERATURE AND PRESSURE

In many applications, calcareous scales are formed under conditions of elevated temperature and pressure. Experiments have revealed that the present inhibitors are stable under such conditions. They are also stable at room temperature for extended periods, and can be kept in solution under normal refrigeration (5° C.) for at least one year without loss of potency.

1. Solutions of the various fractions obtained from oyster shell soluble matrix (SM), were subjected to 120° C., 18 psi, in an autoclave for 1 hour. The potencies of these solutions as inhibitors of CaCO$_3$ formation were measured using the crystallization assay, infra, (pH 8.3, 20° C.) before and after autoclaving. No changes in potencies were detected.

2. The natural peptide-containing and proteinaceous products isolated from biological CaCO$_3$ structures have been tested for stability versus time at room temperature (20° to 25° C.). In these experiments, the ability of the inhibitors to prevent CaCO$_3$ formation in the crystallization assay for 120 hours was measured. The concentration of the inhibitors required to achieve this are shown in Table 2, infra.

3. Stock solutions of the different peptide-containing fractions and the whole SM fraction have been maintained under normal refrigeration in sealed containers for up to a year. Their potencies, as measured using the crystallization assay, were not found to diminish during this period. In some cases, 0.02% by weight of sodium azide was added to the stock solutions of inhibitors (~500 μg/ml distilled $H_2O$) to prevent bacterial contamination.

and total amount of crystal growth was decreased relative to controls in which no inhibitor was added.

The potencies of various inhibitors as measured using the pH-drift assay are shown in Table 2.

TABLE 2
INHIBITION OF $CaCO_3$ FORMATION BY SOME NATURAL AND SYNTHETIC COMPOUNDS

| Compound | Type | Initial pH of Assay | Duration of Lag Phase Prior to Crystal Growth | Inhibitor Concentration (μg/ml) |
|---|---|---|---|---|
| None | Control | 9.5 | 6.46 min ± 2.11* (N = 30)** | zero |
| None | Control | 8.3 | 6.11 min ± 4.05 (N = 25) | zero |
| Neutral, Polyamino Acids | Polypeptides | 9.5 | Same as control, (N = 3) | 20.0 |
| Positive Polyamino Acids | Polypeptides | 9.5 | Same as control, (N = 3) | 20.0 |
| Oyster Shell Soluble Matrix | Glycoprotein | 9.5 | Indefinite*** (N = 20) | 1.20 |
| Oyster Shell Soluble Matrix | Glycoprotein | 8.3 | Indefinite (N = 10) | 0.10 |
| Oyster Shell Soluble Matrix, Fraction Peak III | Glycoprotein | 8.3 | Indefinite (N = 10) | 0.080 |
| Sea Urchin Skeleton Soluble Matrix | Proteinaceous | 8.3 | Indefinite (N = 3) | 0.60 |
| Free Amino Acids, All Types | Monomers | 9.5 | Same as control, (N = 3) | 20.0 |

*Standard Deviation
**Number of Replicate Experiments
***Experiment run for at least 3 hours, at most 120 hours; concentrations less than these amounts result in finite lag phases.

$CaCO_3$ CRYSTALLIZATION STUDIES: POTENCY OF NATURAL SOLUBLE MATRICES AND THEIR ANALOGS 1. pH-Drift Assays.

pH 9.5 Assay. Inhibitory compounds were added to 30 ml of a synthetic sea water (500 mM NaCl, 10 mM KCl) containing Ca at 30 mM and dissolved inorganic carbon (DIC) at 2 mM. The pH of the solution was adjusted to 9.5 by titration with 1.0N NaOH. Crystals of $CaCO_3$ began to grow spontaneously in the absence of inhibitors after a characteristic induction period (lag phase) during which the solution is stable (FIG. 3a). Upon initiation of crystal growth at the end of the lag phase, the pH of the solution begins to drop as a result of equilibrium shifts that accompany removal of $CO_3^{2-}$ ions from solution. The rate of crystal growth was monitored by recording the decrease in pH per unit time (slope of the logarithmic phase, FIG. 3a). Potencies of inhibitors were compared according to their effect on duration of the lag phase prior to crystal growth and their effect on rate of crystal growth at intermediate concentrations of inhibitors.

pH 8.3 Assay. The same conditions as described above were used in this assay except that the synthetic sea water contained 10 mM Ca and 10 mM DIC, and the starting pH was 8.3 (FIG. 3b). At concentrations of the inhibitors that result in partial inhibition, both the rate 2. pH-Stat Assay The ability of matrix proteins to inhibit the rate of calcium carbonate precipitation was tested in 25 ml of media containing 500 mM NaCl and 10 mM KCl. To this media 500 μl of 0.5M $NaHCO_3$ were added to give a final concentration of 10 mM total DIC, and the pH adjusted to 8.4–8.5. Calcium chloride (125 μl of 2M) was then added to the solution to a final concentration of 10 mM. After the ensuing pH transient, the pH was adjusted to 8.30. The induction period was normally about 2 min, after which precipitation would start slowly and then increase to a relatively constant rate. During precipitation, the pH was held constant using a pH-stat system (Metrohm Dosimat 655; Impulsomat 614) and a 0.5M NaOH titrant. Inhibitors to be tested were added to the medium after 25μ moles of NaOH had been titrated, at which time the rate of titration was constant. Inhibition was calculated as the ratio of the rate of titration after inhibitor addition to the rate of titration before inhibitor addition. A representative experiment is shown in FIG. 4.

The results of several experiments for oyster matrix fractions are given in Table 3. The values for 50% inhibition shown therein were obtained from plots of inhibition as a function of inhibitor concentration (FIG. 4). The values for 100% inhibition are given as the maximum range for all samples determined. A range was used because there is a natural variability inherent in the properties of control curves that in turn leads to a variability in the amount of inhibitor required for complete inhibition in a given experiment.

It should be clear from Table 3 that the whole matrix is an extremely potent inhibitor of CaCO₃ crystal growth, and further, that peak III appears to be an even more potent inhibitor than whole matrix. Further, subfractions of peak III were obtained by dividing the peak III eluant from a Sephacryl column into high, medium and low molecular weight regions. It is clear from Table 4 that some fractions, specifically those of low molecular weight, can be obtained with a higher specific activity than whole peak III. For comparison, EDTA, bovine serum albumin, and even phosphovitin (a phosphoprotein) show little or no inhibitor activity at concentrations several times those tested for the soluble matrix.

Only one proteinaceous acid extract obtained by the acetic acid extraction method has been examined. The whole matrix and the ultrafiltrate (which is primarily peak III) have inhibitory activities in the range demonstrated for EDTA whole matrix and peak III, respectively. This extraction method appears to be economically more viable and produce less objectionable byproducts than the EDTA procedure.

An EDTA extract of clam (*Mercenaria mercenaria*) shell resulted in proteinaceous soluble matrix which behaved similarly to oyster matrix when fractionated by gel and ion exchange chromatography. The relative potency of the fractions in regulating crystallization was the same as for oyster matrix, although the absolute activity appeared somewhat lower (Table 5). This is of particular interest in light of the fact that these fractions are substantially free of phosphate. This places in question the often mentioned significane of phosphate groups in the inhibition of carbonate precipitation.

A possible relationship between peak I and peak III proteins appeared to have been found by treating peak I fractions with 0.1N NaOH, for 24 hours at 37° C.

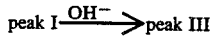

peak I $\xrightarrow{OH^-}$ peak III

The treatment resulted in an increase of the inhibitory activity of the peak III fraction (Table 6). Possibly the treatment hydrolyzes some carbohydrate from the protein, and this removal may unmask active inhibitory groups.

TABLE 3

INHIBITION OF THE RATE OF CALCIUM CARBONATE PRECIPITATION BY OYSTER SHELL SOLUBLE MATRIX FRACTIONS: pH STAT ASSAY.

| | 50% Inhibition | | 100% Inhibition | |
|---|---|---|---|---|
| | μg/ml | N | μg/ml | N |
| Whole Matrix | 1.13 ± 0.20 | 4 | 1.0–2.0 | 8 |
| Peak I | 3.06 ± 0.48 | 4 | >5.0 | 4 |
| Peak II | — | | >10 | 4 |
| Peak III | 0.92 ± .14 | 4 | 0.5–1.5 | 8 |
| Peak III, Filtrate | 0.83 ± 0.32 | 2 | 0.75–1.75 | 2 |

Values are givin as means ± SEM for 50% inhibition and the total range of concentrations that resulted in total inhibition.

TABLE 4

INHIBITION OF THE RATE OF CALCIUM CARBONATE PRECIPITATION BY FRACTIONS OF AN OYSTER EDTA EXTRACT IN WHICH PEAK III WAS SUBFRACTIONATED. pH-STAT ASSAY.

| | 50% Inhibition μg/ml | 100% Inhibition μg/ml |
|---|---|---|
| Whole Matrix | 0.81 | 1.07–1.25 |
| Peak I | 3.87 | 5.0–5.5 |
| Peak II | — | >10.0 |
| Peak III - High MW | 0.87 | 1.25–1.5 |
| Peak III - Mid MW | 0.51 | 0.75–1.0 |
| Peak III - Low MW | 0.40 | 0.75–1.0 |
| Peak III - filtrate | 0.60 | 0.75–1.0 |
| Peak IV | 1.31 | >1.5 |

TABLE 5

INHIBITION OF THE RATE OF CALCIUM CARBONATE PRECIPITATION BY FRACTIONS OF A CLAM SHELL EDTA EXTRACT IN WHICH PEAK III WAS SUBFRACTIONATED: pH-STAT ASSAY.

| | 50% Inhibition μg/ml | 100% Inhibition μg/ml |
|---|---|---|
| Whole Matrix | 2.90 | >4.0 |
| Peak I | 3.93 | >5.0 |
| Peak III | 1.75 | >2.0 |
| Peak III-filtrate | 1.10 | 1.5–1.75 |

TABLE 6

INHIBITION OF THE RATE OF CALCIUM CARBONATE PRECIPITATION BY AN EDTA EXTRACT OF OYSTER SHELL FOR WHICH PEAK I WAS HYDROLYZED IN EITHER 0.1 N NaOH OR 0.1 N H₂SO₄ FOR 24 HRS AT 37° C. pH-STAT ASSAY.

| | 100% Inhibition μg/ml |
|---|---|
| Whole Matrix | 1–1.25 |
| Peak I | >2 |
| Peak I - Acid Hydrolyzed | 1.25–1.67 |
| Peak I - Base Hydrolyzed | 0.8–1.25 |
| Peak III - High MW | 1–1.25 |
| Peak III - Low MW | 0.5–0.75 |

Effect of pH on Potency of Compounds that Inhibit CaCO₃ Formation

A comparison of the potencies of SM, at pH 9.5 and pH 8.3 revealed increased potencies at the lower pH. The comparisons were made relative to control experiments at pH 9.5 and 8.3 in which the solutions were matched for degree of stability as indicated by the duration of lag periods prior to crystal growth. (Table 7.)

It is possible that the increased potency of the compounds at pH 8.3 relative to pH 9.5 results from a conformational shift in the molecules rather than to changes in ionizable groups. In any event, it appears that the compounds are effective over a range of pH values, e.g., 7 to 11, and that the concentration of inhibitors needed varies with pH.

TABLE 7

EFFECT OF pH ON POTENCY OF SOLUBLE MATRIX (SM) FROM OYSTER SHELL

| TREATMENT | CONCENTRATION OF INHIBITORS μg/ml | INITIAL pH | DURATION OF LAG PHASE PRIOR TO CRYSTAL GROWTH MINUTES |
|---|---|---|---|
| Control | None | 9.5 | 6.46 ± 2.11 (N = 30) |
| Control | None | 8.3 | 6.11 ± 4.05 (N = 25) |
| SM | 1.20 | 9.5 | Indefinite* (N = 20) |

TABLE 7-continued

EFFECT OF pH ON POTENCY OF SOLUBLE MATRIX (SM) FROM OYSTER SHELL

| TREATMENT | CONCENTRATION OF INHIBITORS µg/ml | INITIAL pH | DURATION OF LAG PHASE PRIOR TO CRYSTAL GROWTH MINUTES |
|---|---|---|---|
| SM | 0.10 | 8.3 | Indefinite (N = 10) |

*Experiments were run for at least 3 and at most 120 hours. Measurements were made by use of the Crystallization Assay, Supra (20 to 23° C.)

Each of the ionizable groups in the soluble matrix protein is negatively-charged at the pH levels normally encountered both physiologically and industrially. It is thought that these regularly spaced, negatively-charged entities interact with calcium ions of a crystal nucleus and thus regulate its formation. Because the groups also can exist in an uncharged form at low pH, and the relative proportions of charged and uncharged forms is a continuous function of pH, it is expected that the potency of the compounds would be a function of pH. The predicted relationship is one of decreasing potency with decreasing of pH.

EFFECT OF TEMPERATURE ON POTENCY OF COMPOUNDS THAT INHIBIT CaCO₃ FORMATION

Under defined conditions, temperature was shown to exert a striking control over $CaCO_3$ nucleation and crystal growth. Even small increases in temperature can lead to marked increases in rate of crystal formation and growth. Consequently, the effective dose of a compound required to inhibit crystal formation may vary directly with temperature. For a given solution, as temperature increases, the amount of inhibitor needed to control crystal formation also increases.

TABLE 8

EFFECT OF TEMPERATURE ON POTENCY OF OYSTER SHELL SOLUBLE MATRIX (SM), AS INHIBITOR OF $CaCO_3$ FORMATION.

| Treatment | Concentration of Inhibitor µg/ml | Temp., °C. | Minutes, Lag Phase Prior To Crystal Growth | pH/min Rate of Crystal Growth in Log Phase |
|---|---|---|---|---|
| Control | None | 30 | 2 | 0.087 |
| SM, oyster shell | 0.050 | 30 | 5.0 | 0.079 |
| Control | None | 25 | 3.6 | 0.054 |
| SM, oyster shell | 0.050 | 25 | 10.2 | 0.042 |
| Control | None | 20 | 19 | 0.023 |
| SM, oyster shell | 0.050 | 20 | 135 | 0.014 |
| Control | None | 15 | 41.5 | 0.016 |
| SM, oyster shell | 0.050 | 15 | indefinite | NA |
| Control | None | 10 | 137 | 0.006 |
| Control | None | 5 | indefinite | NA |

*Indefinite = greater than 210 minutes. Potencies were measured using the crystallization assay with initial pH 8.3.

Having now fully described the invention, it will be apparent to one of ordinary skill in the art that many changes and modifications can be made thereto, without departing from the spirit or scope of the invention as set forth therein.

What is claimed as new and desired to be secured by Letters Patent of the United States is:

1. A method of inhibiting the formation of $CaCO_3$-containing deposits on a surface, comprising applying to said surface a composition comprising between at least $10^{-4}$ and 1000 µg/ml of a peptide-containing fraction isolated from a $CaCO_3$-containing tissue obtained from a $CaCO_3$-forming organism; wherein the molecular weight of the peptide-containing fraction is 150,000 or lower, and wherein the peptide-containing fraction is obtained by a method comprising the step of placing the $CaCO_3$-containing tissue in contact with an aqueous solution selected from the group consisting of 0.001–30 g/100 ml of a calcium chelating agent, 0.001–20 g/100 ml or ml/100 of a weak organic acid and an inorganic acid wherein the pH of said solution is maintained at about 1–5 during the isolation of said fraction, for an appropriate length of time.

2. The method of claim 1 wherein the peptide-containing fraction has a MW of at least about 400 dalton.

3. The method of claim 2 wherein the peptide-containing fraction has a MW of about 2,000–120,000 dalton.

4. The method of claim 3 wherein the peptide-containing fraction has a MW of about 5,000–60,000 dalton.

5. The method of claim 3 wherein the peptide-containing fraction has a MW of about 60,000–120,000 dalton.

6. The method of claim 1, further comprising admixing said peptide-containing fraction with an aqueous solution of an inorganic base or an inorganic acid having a final concentration of 0.001–10N.

7. The method of claim 1 wherein the surface to which the peptide-containing fraction is applied is made of a material selected from the group consisting of wood, glass, ceramic, metal, synthetic polymers and copolymers and painted or otherwise coated surfaces.

8. The method of claim 1 wherein said peptide-containing fraction is applied in admixture with a carrier in the form of a powder, solution, suspension, gel, oil, aerosol, paste, or viscous colloid.

9. The method of claim 8, wherein the carrier is a paint.

10. The method of claim 1, wherein the $CaCO_3$-containing deposit comprises a $CaCO_3$-forming organism.

11. The method of claim 10, wherein 0.001%–90% by weight of the composition, of the peptide-containing fraction is applied to said surface.

12. The method of claim 1, wherein about 0.001–1,000 µg/ml of the peptide-containing fraction are added to said liquid.

13. A method of inhibiting the formation of $CaCO_3$-containing deposits on a surface, comprising applying to said surface a composition comprising between about $10^{-4}$ and 1000 μg/ml of a protein-containing fraction isolated from a $CaCo_3$-containing tissue obtained from a $CaCO_3$-forming organism; wherein the molecular weight of the protein-containing fraction is 200,000 or higher, and wherein the protein-containing fraction is obtained by a method comprising the step of placing the $CaCO_3$-containing tissue in contact with an aqueous solution selected from the group consisting of 0.001-30 g/100 ml of a calcium chelating agent, 0.001-20 g/100 ml or ml/ml of a weak organic acid and an inorganic acid wherein the pH of said solution is maintained at about 1-5 during the isolation of said fraction, for an appropriate length of time.

14. The method of claim 13 wherein the protein-containing fraction has a MW of up to about $10^8$.

15. The method of claim 14 wherein the protein-containing fraction has a MW of about $10^6$-$10^7$.

16. The method of claim 13 wherein the surface to which the protein-containing fraction is applied is made of a material selected from the group consisting of wood, glass, ceramic, metal, synthetic polymers and copolymers, and painted or otherwise coated surfaces.

17. The method of claim 13, wherein said protein-containing fraction is applied in admixture with a carrier in the form of a powder, solution, suspension, gel, oil, aerosol, paste, or viscous colloid.

18. The method of claim 17 wherein the carrier is a paint.

19. The method of claim 13 wherein the $CaCO_3$-containing deposit comprises a $CaCO_3$-forming organism.

20. The method of claim 19 wherein 0.001%-90% by weight of the composition, of the protein-containing fraction is applied to said surface.

21. The method of claim 13 wherein about 0.001-1,000 μg/ml of the protein-containing fraction.

* * * * *

UNITED STATES PATENT AND TRADEMARK OFFICE
CERTIFICATE OF CORRECTION

PATENT NO. : 4,587,021

DATED : MAY 6, 1986

INVENTOR(S) : A. P. WHEELER, STEVEN SIKES

It is certified that error appears in the above—identified patent and that said Letters Patent is hereby corrected as shown below:

Introduction page, delete the diagram

Figure 5:
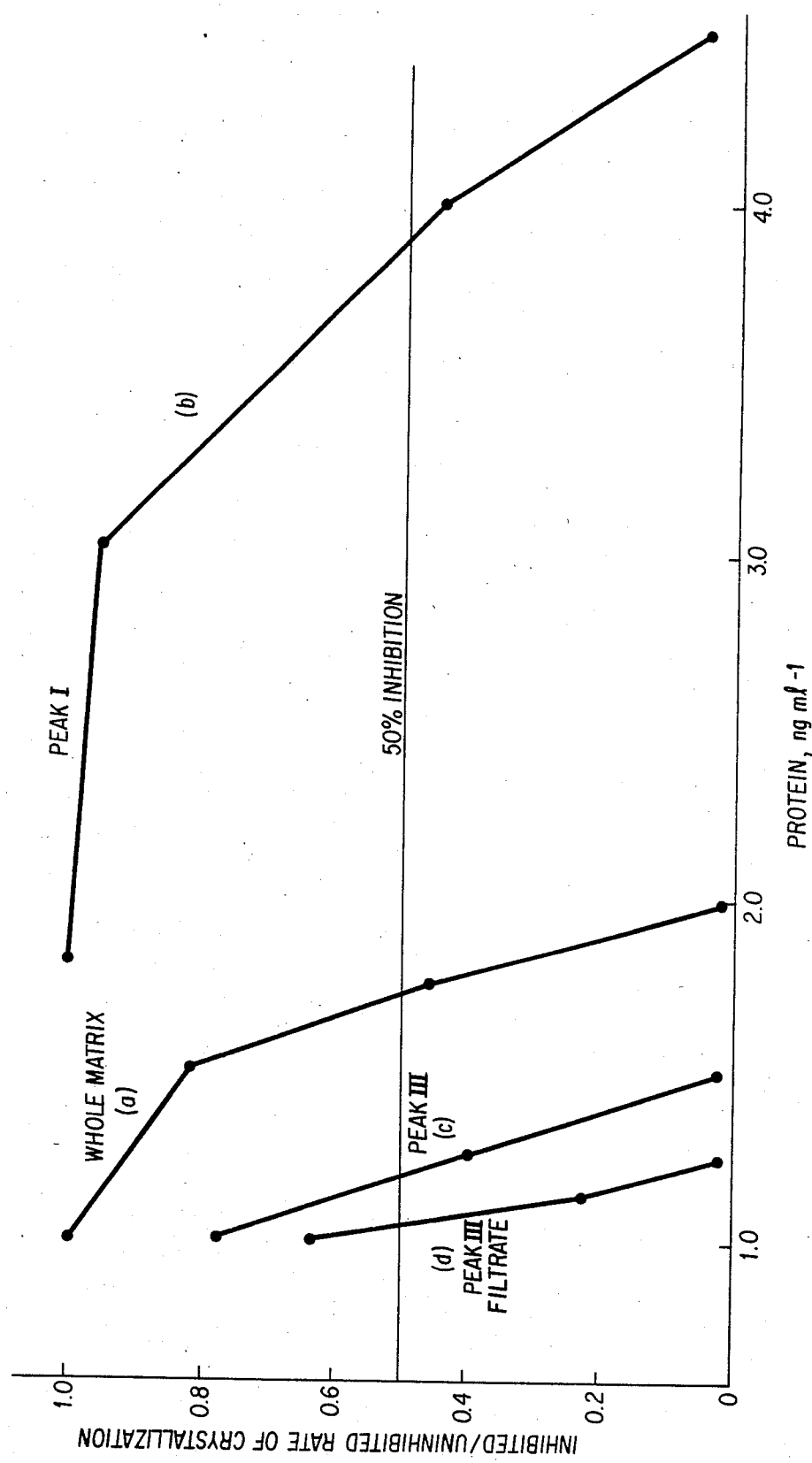

In Figure 5, delete "ng ml$^{-1}$" and insert --µg ml$^{-1}$--;

In Column 2, line 19, delete "lift" and insert --life--;

In Column 4, line 14, delete "heretofor" and insert --heretofore--;

In Column 9, line 39, delete "10$^{-14}$" and insert --10$^{-4}$--;

In Column 10, line 17, delete "contacct" and insert --contact--;

In Column 10, line 66, delete "C.," and insert --C.--;

In Column 12, line 27, delete "Aceta" and insert --Acta--;

UNITED STATES PATENT AND TRADEMARK OFFICE
CERTIFICATE OF CORRECTION

PATENT NO. : 4,587,021
DATED : MAY 6, 1986
INVENTOR(S) : A. P. WHEELER, STEVEN SIKES

It is certified that error appears in the above—identified patent and that said Letters Patent is hereby corrected as shown below:

In Column 13, line 53, delete "L"

In Column 14, line 12, delete "an" and insert --in--;

In Column 17, line 21, delete "produce" and insert --produces--;

In Column 17, line 32, delete "significane" and insert --significance--;

In Column 21, line 3, delete "$CaCo_3$" and insert --$CaCO_3$--;

UNITED STATES PATENT AND TRADEMARK OFFICE
CERTIFICATE OF CORRECTION

PATENT NO. : 4,587,021
DATED : MAY 6, 1986
INVENTOR(S) : A. P. WHEELER, STEVEN SIKES

It is certified that error appears in the above—identified patent and that said Letters Patent is hereby corrected as shown below:

In Column 22, line 18, delete "...of the protein-containing fraction." and insert --...of the protein-containing fraction are added to said liquid.--

Signed and Sealed this

Fourth Day of November, 1986

[SEAL]

Attest:

DONALD J. QUIGG

Attesting Officer

Commissioner of Patents and Trademarks